US005837079A

United States Patent [19]

Patton et al.

[11] Patent Number: 5,837,079

[45] Date of Patent: Nov. 17, 1998

[54] FILM ORIENTING SLIDE MOUNTER AND METHOD

[75] Inventors: David L. Patton, Webster; Daniel M. Pagano; Dale F McIntyre, both of Honeoye Falls; Edward Weissberger, Pittsford, all of N.Y.

[73] Assignee: Eastman Kodak Company, Rochester, N.Y.

[21] Appl. No.: 896,374

[22] Filed: Jul. 18, 1997

[51] Int. Cl.[6] .................. B32B 31/00

[52] U.S. Cl. .................. 156/64; 156/264; 156/362; 156/364; 156/517; 156/521; 271/186; 271/187; 353/103; 353/108

[58] Field of Search .................. 156/64, 256, 264, 156/362, 363, 364, 517, 521; 53/52; 271/184, 185, 186, 187; 353/103, 108

[56] References Cited

U.S. PATENT DOCUMENTS

| | | | |
|---|---|---|---|
| 4,543,771 | 10/1985 | Jensen et al. | 53/520 |
| 4,561,167 | 12/1985 | Saito | 29/564.6 |
| 4,698,883 | 10/1987 | Blättner et al. | 29/56.5 |
| 4,919,747 | 4/1990 | Eagle | 156/497 |
| 4,934,124 | 6/1990 | Savio et al. | 53/411 |
| 5,157,439 | 10/1992 | Sakamoto et al. | 355/28 |
| 5,459,538 | 10/1995 | Petry, Jr. et al. | 353/103 |
| 5,535,997 | 7/1996 | Croyle et al. | 271/12 |

FOREIGN PATENT DOCUMENTS

| | | | |
|---|---|---|---|
| 62-78841 A | 4/1987 | Japan | 156/362 |
| 2128366 | 4/1984 | United Kingdom | 156/64 |

*Primary Examiner*—David A. Simmons
*Assistant Examiner*—Paul M. Rivard
*Attorney, Agent, or Firm*—Robert Luke Walker

[57] ABSTRACT

An automated film slide orienting and mounting system includes at least one detector for detecting the orientation of film, a knife assembly for successively cutting the film to generate film segments, a rotatable table for orienting the film segments into a proper orientation, a set of driver assemblies for progressively moving each film segment for insertion into a slide mount, and a magnetic writing device for writing the orientation of the film segment magnetically onto the slide mount in a region of magnetic material disposed upon each slide mount.

19 Claims, 3 Drawing Sheets

FILM ORIENTING SLIDE MOUNTER AND METHOD

CROSS REFERENCE TO RELATED APPLICATIONS

Reference is made to commonly assigned co-pending U.S. patent applications Ser. No. 08/775,677, entitled: METHOD AND APPARATUS FOR PREPARING PHOTOGRAPHIC FILM UNITS HAVING IMAGE FRAME ASSOCIATED ENCODED INFORMATION, and filed in the names of Richard Bauer, Dale McIntyre, Daniel Pagano, David Patton, and Edward Weissberger; Ser. No. 08/775,326, entitled: FILM SLIDES HAVING ENCODED DATA AND METHODS FOR PREPARING FILM SLIDES, and filed in the names of Dale McIntyre, Daniel Pagano, David Patton, and Edward Weissberger; Ser. No. 08/77,814, entitled: FILM SLIDES HAVING DATA WINDOWS, and filed in the names of Dale McIntyre, Daniel Pagano, David Patton, and Edward Weissberger; Ser. No. 08/775,321, entitled: ORIENTING PROJECTOR, and filed in the names of Dale McIntyre, Daniel Pagano, David Patton, and Edward Weissberger; Ser. No. 08/775,816, entitled: FORMATTING PROJECTOR, and filed in the names of Dale McIntyre, Daniel Pagano, David Patton, and Edward Weissberger; Ser. No. 08/775,847, entitled: ANNOTATION DISPLAYING PROJECTOR, and filed in the names of Dale McIntyre, Daniel Pagano, David Patton, and Edward Weissberger; U.S. patent application Ser. No. 08/896,841 entitled: FILM SLIDE AND FILM EXTRACTOR, and filed in the names of Daniel Pagano, Dale McIntyre, David Patton, and Edward Weissberger; U.S. patent application Ser. No. 08/897,169 entitled: DEFINED ORIENTATION SLIDE PROJECTOR AND SLIDES, and filed in the names of Daniel Pagano, David Patton, Dale McIntyre, and Edward Weissberger; U.S. patent application Ser. No. 08/897,171 entitled: FILM SEGMENT PRINTING SYSTEM AND METHOD, and filed in the names of David Patton, Daniel Pagano, Dale McIntyre, and Edward Weissberger; U.S. patent application Ser. No. 08/896,844 entitled: SLIDE WITH MAGNETIC MARKS THAT CAN BE READ BY MULTIPLE HEADS, and filed in the names of Dale McIntyre, Daniel Pagano, David Patton, and Edward Weissberger; each of which are assigned to the assignee of this application.

FIELD OF THE INVENTION

This invention relates generally to the field of film slides, and in particular to the orientation and mounting of film in film slides.

BACKGROUND OF THE INVENTION

Film slides are typically constructed by inserting and securing a portion or segment of film into an empty slide mount. Heretofore, in automated systems for mounting film segments in slide mounts, the film segments are typically inserted into the slide mount in any orientation, or oriented correctly by manual insertion of a processed roll of film into the mounter. Proper orientation of each film slide has generally required individual visual inspection and orienting of each film slide by an operator, such as during the viewing of the film slides. Generally, the slide mounts are symmetrical constructed, which facilitates misorientation of the slides, since the flipping of the slide about one or more axes away from a proper orientation may not be readily detectable until the projector generates images therefrom which then appear misoriented. Such misorientation of the slides and images may causes inconvenience and/or embarrassment; for example, when presenting such images to a mass audience.

Accordingly, a need exists for mounting film segments into slide mounts in a predetermined proper orientation. In addition, a need exists for an automated system which may rapidly and accurately construct mounted slides with the proper orientation for subsequent view.

SUMMARY OF THE INVENTION

It is recognized herein that the construction of film slides in a predetermined proper orientation may be performed using an automated system.

An automated film slide orienting mounting system is disclosed which includes a detector for detecting the orientation of film; a knife assembly for successively cutting the film to generate film segments; a rotatable table for orienting the film segments into a proper orientation; a set of driver assemblies for progressively moving each film segment for insertion into a slide mount; and a magnetic writing device for writing the orientation of the film segment magnetically onto the slide mount in a region of magnetic material disposed upon each slide mount.

The disclosed automated film slide mounting system may therefore rapidly and accurately detect the orientation of each film segment, may properly orient misoriented film segments, and may automatically mount slides with the proper orientation for subsequent imaging therefrom. Such proper orientation may be insured by encoding the orientation upon the slide mount, for example, using the magnetic region disposed upon each slide mount.

BRIEF DESCRIPTION OF THE DRAWINGS

The features and advantages of the present invention will become readily apparent, and are to be understood, by referring to the following detailed description of the preferred embodiments of the present invention, taken in conjunction with the accompanying drawings, in which.

DETAILED DESCRIPTION OF THE INVENTION

Figure 1:
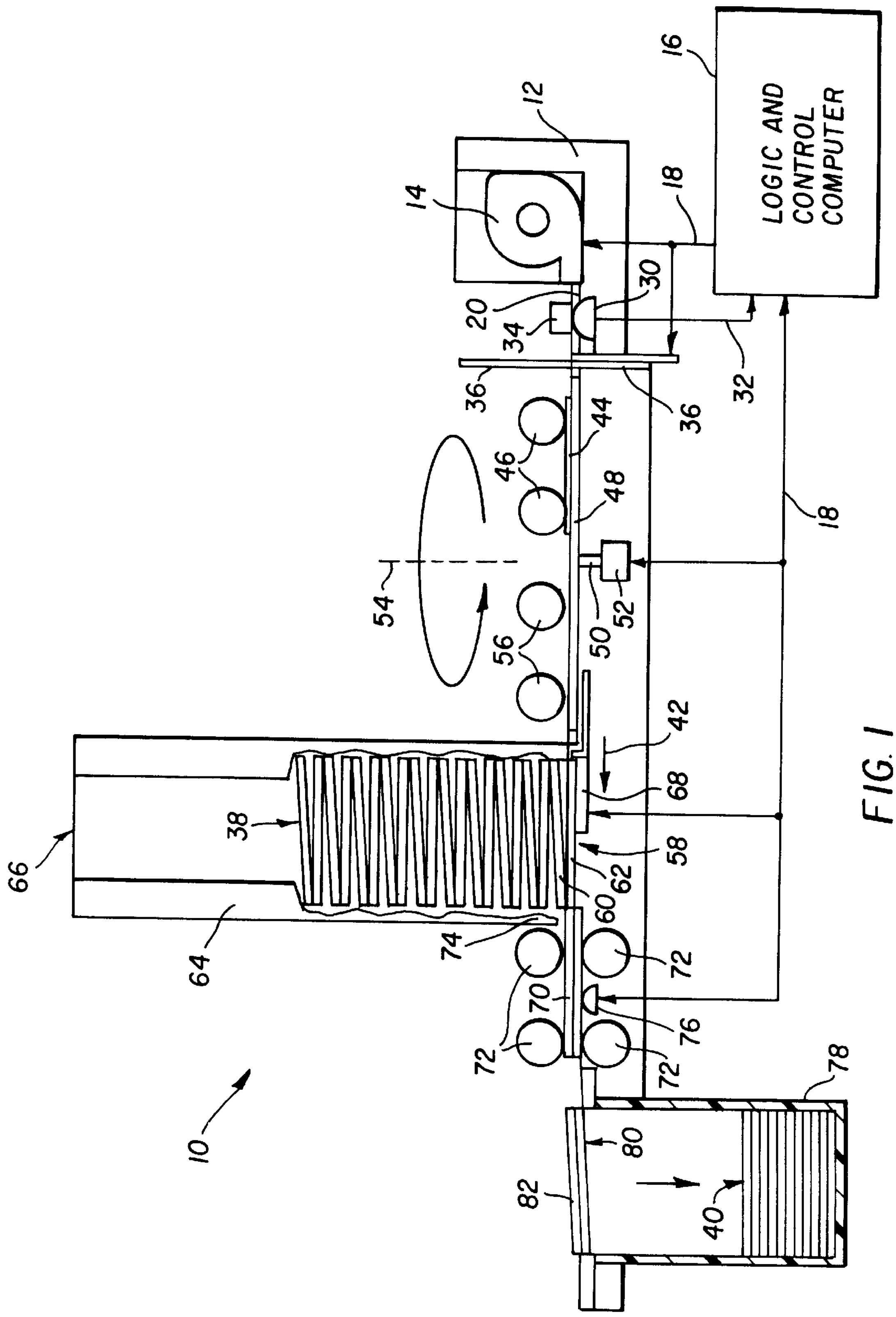
FIG. 1 is a side cross-sectional view of the disclosed mounting system.

Referring in specific detail to the drawings, with common reference numbers identifying similar or identical elements, steps, and features, as shown in FIG. 1, the present invention is directed to a film slide orienting and mounting system 10, and a method of use thereof. The system 10 has a plurality of operating stations which are automated to detect the orientation of film, successively generate film segments from the film, orient the film segments into a proper orientation, drive the film segments into a slide mount, and magnetically write the orientation of the film segment onto the slide mount in a region of magnetic material disposed upon each slide mount.

As shown in FIG. 1, the present disclosure includes a frame 12 for mounting a magazine 14 and/or reel, spool, cartridge, or cassette of film. The film may be Advanced Photographic System (APS) film, 35 mm film, or other sizes and formats of film. The frame 12 may include a motor (not shown in FIG. 1) which is operated by a logic and control computer 16 which provides control signals thereto via an output bus 18. The logic and control computer 16 may perform as a central processing unit (CPU) of the disclosed mounting system 10 and also in conjunction with other computing systems.

For example, the logic and control computer 16 may be or may include a commercially available microprocessor and/or a microcontroller, such as the MC68HC05 microcontroller available from "MOTOROLA", and may be incorporated into a personal computer having a memory, such as a hard or fixed drive and/or other digital storage devices. By executing predetermined software and/or firmware routines, the logic and control computer 16 may operate the disclosed mounting system 10 as an automated system with high accuracy and high handling rates for high volume film handling applications. The logic and control computer 16 generates and outputs the control signals on the output data bus 18, with such control signals directed to any one or combinations of the components described herein. In this manner, the disclosed mounting system 10 may be controlled by predetermined software and/or firmware implemented by the logic and control computer 16. Such control may be used by the disclosed mounting system 10 to automatically generate and handle a plurality of film segments 44, a plurality of unmounted slide mounts 38, and a plurality of mounted film slides 40.

In addition, the control of each of the stations and components of the disclosed mounting system 10 may be coordinated by the control signals such that the operation of each of the components may be performed repeatedly and cyclically to handle the series of film segments 44, slide mounts 38, and mounted slides 40, with the various stations and components timed to operate on a successive film segment, slide mount, and mounted slide after finishing operation on a current film segment, slide mount, and mounted slide, respectively. Such control may be used to automatically and rapidly handle a great amount of film, slide mounts, and slides with relatively high accuracy.

In response to such control signals, the motor of the frame 12 drives or unspools the stored film out of the magazine 14 or spool, such as an APS film magazine or from a spool of processed film, and feeds the film into a path 20 for subsequent handling, as described below.

Figure 2:
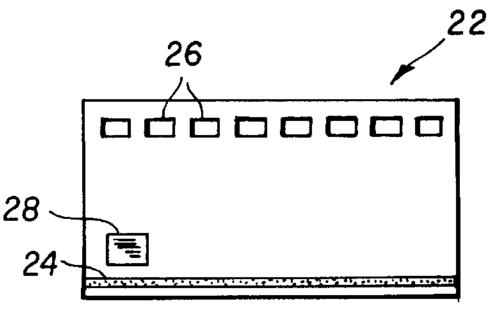
FIG. 2 is a top view of a portion of film.

An illustrative portion of the film 22 used in the disclosed mounting system 10 is shown in FIG. 2. The film segment has a magnetic coating on at least a base side portion forming a predetermined region 24 or strip of magnetic material. Alternatively, the entire film 22 may be composed of or coated with a magnetic material, with the magnetic region 24 at predetermined locations on the film 22 such that information is only stored in such predetermined locations. The film 22 may also include at least one perforation 26, and a predetermined region 28 of the film 22 may be utilized to store a bit for data checking. The predetermined region 28 may be a specific location configured, for example, in a square, and implemented optically. The predetermined region 28 may be called a "fat" bit data region, for example, due to the relative size and configuration of the predetermined region 28, for storing the bit as a "fat" bit. An optical sensor scanning the film 22 may readily locate the fat bit of the film 22 at the predetermined region 28 due to the different optical characteristics of the predetermined region 28 created by optically generating the fat bit. The fat bit and fat bit reader are described in commonly assigned U.S. patent application Ser. No. 08/897,171 entitled: FILM SEGMENT PRINTING SYSTEM AND METHOD, and filed in the names of David Patton, Daniel Pagano, Dale McIntyre, and Edward Weissberger; which is incorporated herein by reference.

After being fed into the path 20, the film 22 is passed substantially adjacent to a magnetic reader 30 having an operative surface or head. The magnetic reader 30 is positioned to detect the magnetic region 24. The magnetic region 24 may store orientation information, which the magnetic reader 30 reads and transmits to the logic and control computer 16 via an input bus 32. Alternatively, the magnetic region 24 may not store orientation information, but the logic and control computer 16 may determine the orientation of the film segment 22 by the detection or lack of detection of the magnetic region 24 by the magnetic reader 30. That is, if the magnetic region 24 is not positioned in a predetermined location to be substantially adjacent to the magnetic reader 30 for reading by the magnetic reader 30, such absence of the magnetic region 24 may indicate Disorientation of the film 22.

Alternative to, or in conjunction with, the magnetic reader 30, the mounting system 10 may include a detector 34 for detecting the orientation of the film 22. In one alternative embodiment, the detector 34 may be an optical detector for detecting the location of the at least one perforation 26 as an indicator of the orientation of the film 22. In another alternative embodiment, the detector 34 may be a fat bit reader for detecting the location of, and/or the information from, the fat bit region 28 as described in commonly assigned U.S. patent application Ser. No. 08/897,171 entitled: FILM SEGMENT PRINTING SYSTEM AND METHOD, and filed in the names of David Patton, Daniel Pagano, Dale McIntyre, and Edward Weissberger; which is incorporated herein by reference.

The detector 34 generates appropriate detection signals to be transmitted to the logic and control computer 16 via the input bus 32. The logic and control computer 16 then stores film segment orientation data in a memory (not shown in FIG. 1) representing the detected orientation of the film 22 and the film segments generated therefrom.

After detection of the orientation of the film 22, the film 22 is driven to pass through or adjacent to a knife assembly 36 which is controlled by the logic and control computer 16 through the output bus 18 to cut the film 22 into single individual pieces or film segments, such as the film segment 44. The knife assembly may be a guillotine and/or a rotating blade. The knife assembly 36 may be timed and/or may operate cyclically such that the cutting of the film 22 causes each film segment generated therefrom to be appropriately dimensioned for mounting into a respective one of the slide mounts 38 to form the mounted slides 40; that is, slide mounts with individual film segments 44 of the film 22 mounted therein.

After operation of the knife assembly 36, each film segment of the cut film 22 is driven longitudinally through the mounting system 10 in the direction of the arrow 42 indicating a longitudinal direction of operation. The disclosed mounting system 10 is described below with reference to FIGS. 1–5 for an illustrative film segment 44. As shown in FIG. 1, the film segment 44 is driven by a first driver assembly 46 to be placed and held at a first position on a platform or table 48.

Figure 3:
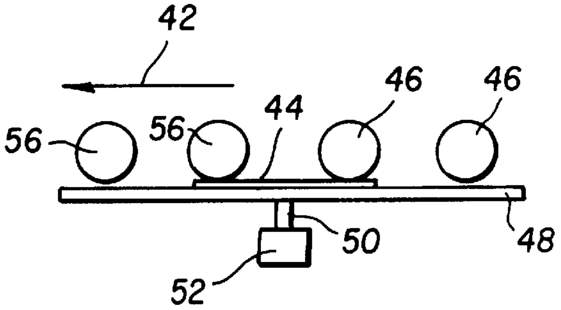
FIGS. 3–4 are side cross-sectional views of a film segment being progressive moved across a rotatable table.
Figure 4:
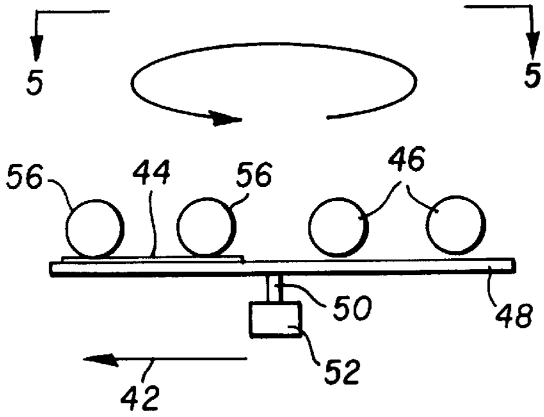

The film segment 44 may then be driven by the first driver assembly 46 to a second position on the table 48, as shown in FIG. 3, so as to allow a second driver assembly 56 to engage the film segment 44. The driver assemblies 46 and 56 may place and hold the film segment 44 in the second position, or may proceed to drive the film segment 44 to a third position, as shown in FIG. 4. The driver assemblies 46 and 56 may include at least one roller capable of rotating in a first direction about an axle by at least one respective motor (not shown in FIG. 1). The rollers rotate in response to control signals from the logic and control computer 16 via connections (not shown in FIG. 1) to the output bus 18.

The second driver assembly 56 may place and hold the film segment 44 in the third position, or may proceed to drive the film segment 44 into an available slide mount 58 having a top portion 60 and a bottom portion 62. The available slide mount 58 may be located so as to be a lowest slide mount in the stack of slide mounts 38 positioned in a first housing 64 to successively receive a respective film segment. The first housing 64 may be a magazine of slide mounts 38 with an opening 66 at a top portion which is adapted to receive additional slide mounts 38. The first housing 64 may be dimensioned to substantially fit each of the slide mounts 38, as shown in FIG. 1.

After the film segment 44 is driven into the available slide mount 58 via the driver assemblies 46 and 56, the slide mount 58 with the film segment 44 mounted therein is then slid out of the stack of slide mounts 38 by a pusher 68 or ram. The pusher 68 may be an arm or bar which is moved by a pusher motor (not shown in FIG. 1) operating in response to control signals from the logic and control computer 16 via the output bus 18. The pusher 68 moves in the longitudinal direction parallel to the arrow 42 in a back-and-forth manner between predetermined positions, such as an initial position as shown in FIG. 1 and a second position, to cyclically push the lowest slide mount out of the stack of slide mounts 38. The pusher 68 then resets to push a next slide mount which moves downward under the influence of gravity to be the lowest slide mount for receiving a successive film segment from the driver assemblies 46 and 56.

As the slide mount 58 is pushed out, with a film segment positioned between the portions 60 and 62, the slide mount 58 is closed; that is, the portions 60 and 62 are moved to be in a secured arrangement to form a closed slide 70 which is moved longitudinally by a third driver assembly 72. The portions 60 and 62 may be secured by opposing pressure on the surfaces of each of the portions 60 and 62 by the rollers of the third driver assembly 72. Accordingly, the third driver assembly 72 may operate as a laminator with pinch rollers which force the portions 60 and 62 together. The portions 60 and 62 may include fastening means, for example, including pressure-sensitive adhesive on opposing surfaces of the portions 60, 62 or interlocking tabs and apertures, such that the portions 60 and 62 are substantially fused or secured together to form a closed or mounted slide 82. Alternatively, the portions 60 and 62 may be secured by downward pressure by an overhanging edge 74 of the first housing 64.

As the closed slide 70 is advanced longitudinally by the third driver assembly 72, the slide mount thereof is caused to pass substantially adjacent to a magnetic writer 76. In response to data signals from the logic and control computer 16 via the output bus 18, the magnetic writer 76 writes data onto a region of magnetic material of the slide mount of the closed slide. The region of magnetic material may be configured as a set of magnetic tracks and/or a magnetic strip 112 across a length of the slide, as shown, for example, in FIG. 8. The data written to the slide mount by the magnetic writer 76 may include the orientation of the film segment in the slide mount, a timestamp of the date and time of the mounting, a label indicating information concerning the nature of the images of the film segment, etc.

The third driver assembly 72 continues to drive the closed slide 70 so it is positioned to enter a second housing 78. For example, the closed slide 70 may be driven to be positioned over an opening 80 at a top portion of the second housing 78, such as the entering slide 82 in FIG. 1. The entering slide 82 may then move downward under the influence of gravity to be stacked in a stack of mounted slides 40.

As shown in FIG. 1, the table 48 is rotatably mounted on a support 50 connected to a motor 52 which responds to control signals from the logic and control computer 16 to rotate about a central axis 54. In one embodiment, the direction of rotation may be predetermined. In an alternative embodiment, the direction of rotation may be controlled by appropriate control signals from the logic and control computer 16. In addition, the range of angular rotation of the table 48 may be limited or unlimited. For example, the table 48 may be limited to rotate only 180° in either direction, or may be limited to rotate in multiples of 180° in one direction, such as 0° (no rotation), 180°, and 360°.

With the film segment 44 in any of the first position shown in FIG. 1, the second position shown in FIG. 3, and the third position shown in FIG. 4, the logic and control computer 16 may evaluate the orientation of the film segment 44 before proceeding to mount the film segment 44 into the available slide mount 58. In evaluating the orientation, the logic and control computer 16 compares the film segment orientation data stored in the memory with slide mount orientation data also stored in the memory. The slide mount orientation data represents the orientation of the slide mounts 38 in the first housing 64; for example, an orientation in which the images stored on a film segment in a slide mount have a lower portion positioned within a predetermined lower portion of the slide mount. The slide mount orientation data may be input into the memory by an operator using an input device (not shown in FIG. 1). Alternatively, the slide mount orientation data may be input into the memory from an orientation detector (not shown in FIG. 1) which reads the magnetic strip 112 on the slide mount, and which is positioned within the first housing 64 substantially adjacent to, for example, the lowest slide mount 58.

After the comparison of film segment orientation data and the slide mount orientation data, if the two orientations match, the film segment 44 is driven by the driver assemblies 46 and 56 to be mounted into the slide mount 58, as described above. However, the film segment 44 may be determined to be in a reverse orientation relative to the slide mount 58; that is, a lower portion of the film segment 44 and a lower portion of the slide mount 58 are separated by a 180° angular displacement in a parallel plane. In response to such a reverse orientation, the logic and control computer 16 rotates the table 48 in the plane of the table 48 by an angular displacement of 180°, thus placing both the film segment 44 and the slide mount 58 in an identical angular orientation; that is, having predetermined corresponding lower portions thereof with an angular displacement of 0° in a plane.

The re-oriented film segment 44 is then advanced by at least one of the assemblies 46 and 56 into the slide mount 58 to be mounted therein. The advancement may be performed by reversing the direction of rotation of the appropriate driver assemblies 46 and 56 about respective axles, since the rotation of the table 48 may also require the rotation and/or revolution of the driver assemblies 46 and 56 about the central axis 54. The slide mount is then closed and information is then magnetically written onto the slide mount, as described above.

In a preferred embodiment, the rotation of the table 48 is performed when the film segment 44 is positioned in the first position, as shown in FIG. 1. Rotation of the table 48 thus re-orients the film segment 44, but moves the entire film segment 44 to the third position, since the first and third positions are transposed under the 180° angular displacement in a plane. In an alternative embodiment, the rotation of the table 48 may be performed when the film segment 44 is positioned in the third position, as shown in FIG. 4. Thus, rotation of the table 48 in the alternative embodiment re-orients the film segment 44, but moves the entire film segment 44 to the first position, since the first and third positions are transposed in the alternative embodiment as well.

Figure 5:
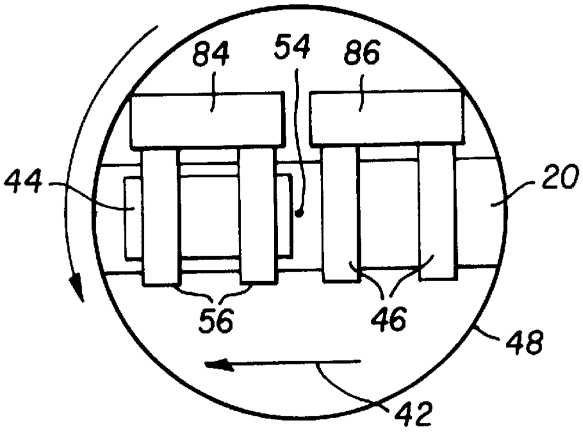
FIG. 5 is a top plan view of the rotatable table in the direction of the arrow 5—5 of FIG. 4.

As shown in the top plan view of FIG. 5 corresponding to the view in the direction of the arrows 5—5 in FIG. 4, in the above-described embodiments involving rotation of the table 48, the entire table 48, along with the film segment 44 and the driver assemblies 46 and 56 mounted on respective assembly frames 84 and 86, is rotated about the central axis 54, but the film segment 44 is to be driven in the longitudinal direction of the arrow 42, regardless of any rotation of the table 48 and components therewith.

In the above-described embodiments, the rotation of the table 48 with corresponding rotation or revolution of the driver assemblies 46 and 56 causes the driver assemblies 46 and 56 to be re-oriented relative to the longitudinal direction of the arrow 42. Accordingly, the angular rotation of each roller about its respective axle is to be reversed after the rotation of the table 48 in order to drive the film segment 44 in the longitudinal direction of the arrow 42. Thus, the angular rotation of each roller about its respective axle is to be invariant relative to the longitudinal direction of the arrow 42, regardless of the rotation of the table 48.

Figure 6:
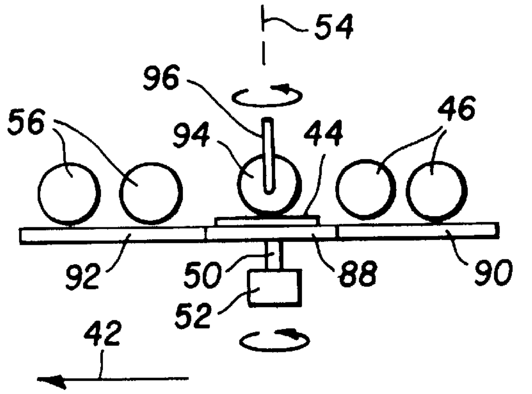
FIGS. 6–7 are side cross-sectional views of alternative embodiments of a rotatable table.

In another alternative embodiment shown in FIG. 6, a rotatable table 88 may have a smaller surface area than the table 48 shown in FIGS. 1 and 3–5, with the rotatable table 88 only rotating and re-orienting the film segment 44 when the film segment 44 is in the second position. Along the longitudinal direction of the arrow 42, the rotatable table 88 may be flanked by surfaces 90 and 92 upon which the driver assemblies 46 and 56, respectively, drive the film segment 44 in the first position and the third position, respectively.

As shown in FIG. 6, the film segment 44 may be moved from the first surface 90 to the rotatable table 88 and thence to the second surface 92 using a fourth driver assembly 94 mounted, for example, on a rotatable frame 96. Accordingly, as the rotatable table 88 rotates to re-orient the film segment 44, as needed, the fourth driver assembly 94 holds the film segment 44 in the second position, and performs a corresponding rotation about the central axis 54, and also reverses the angular rotation of its roller about an axle, as needed, to move the film segment 44 in the longitudinal direction of the arrow 42.

In the embodiment of FIG. 6, the driver assemblies 46 and 56 may be fixed against rotation in the horizontal plane; that is, non-rotatable about the axis 54, but may rotate the corresponding rollers in a vertical plane in a single fixed horizontal angular direction about respective axles to move the film segment 44 in the longitudinal direction of the arrow 42. Accordingly, the use of the relatively smaller rotatable table 88 and the rotatable fourth driver assembly 94 does not require additional apparatus for rotating the driver assemblies 46 and 56 in the horizontal plane, and for changing the direction of rotation of the corresponding rollers in the vertical plane.

Figure 7:
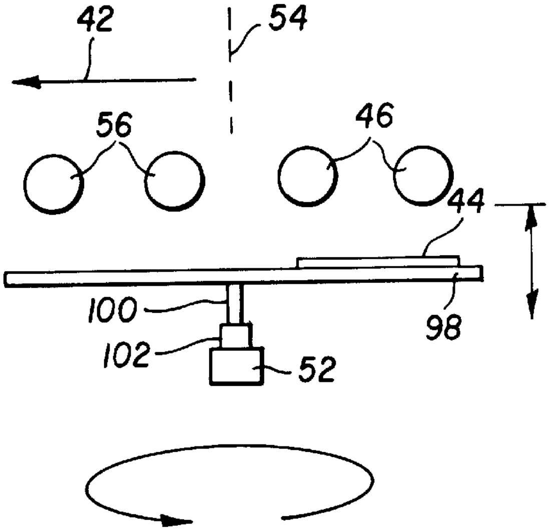

In another alternative embodiment, as shown in FIG. 7, the mounting system 10 may have a table 98, corresponding to the table 48 in FIG. 1, but movable in an upward and downward direction in response to a distance control signal from the logic and control computer 16. Accordingly, when the table 98 is in a first vertical position having a first distance from the assemblies 46 and 56, by moving the table 98 and the film segment 44 thereupon away from the driver assemblies 46 and 56, the table 98 is then positioned in a second vertical position having a second distance from the assemblies 46 and 56, with the second distance greater than the first distance. The driver assemblies 46 and 56 may be in a fixed vertical position and incapable of rotating in the horizontal plane.

With the film segment 44 moved away from the driver assemblies 46 and 56, the film segment 44 and the table 98 are free to rotate about the central axis 54. Such rotation of the table 98 re-orients the film segment 44 by moving the film segment 44, for example, from the first position in the longitudinal direction of the arrow 42, as shown in FIG. 7, to the third position in the longitudinal direction of the arrow 42, similar to the third position shown in FIG. 4. The table 98 with the re-oriented film segment 44 thereupon may then be raised back to the first vertical position with the first distance relative to the driver assemblies 46 and 56 to engage at least one of the driver assemblies 46 and 56 to drive the film segment 44 along the longitudinal direction to be mounted in the slide mount 58, as described above with reference to FIG. 1.

The table 98 may be mounted upon a telescoping structure having a first portion 100 retractable to a position within a second portion 102 which is rotated by the motor 52 to rotate the entire table 98. Such raising and lowering of the table 98 and such rotation of the table 98 may be controlled by appropriate control signals from the logic and control computer 16. Alternatively, the table 98 may be fixed vertically and the assemblies 46 and 56 may be movable vertically. Still further, both the table 98 and the assemblies 46 and 56 may be movable vertically.

Figure 8:
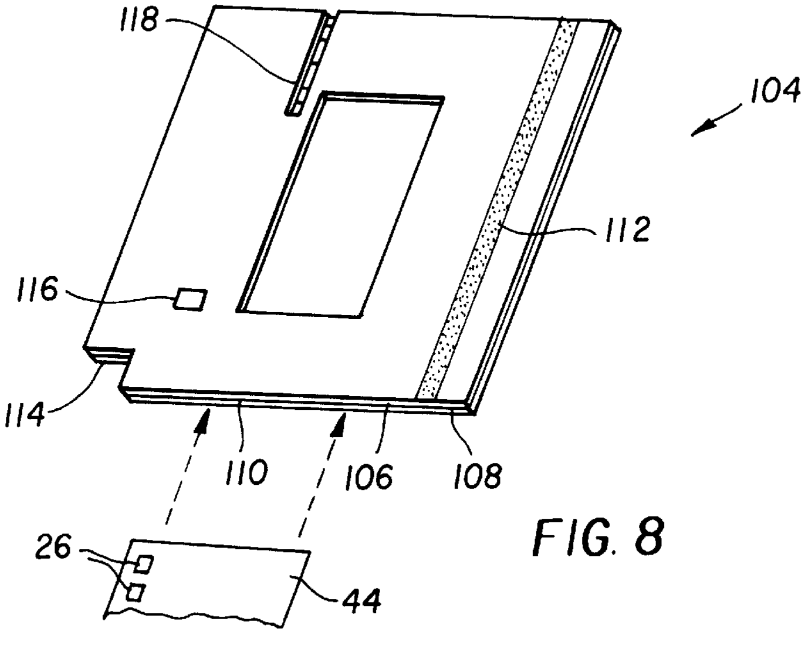
FIG. 8 is a top perspective view of a film segment being inserted into a slide mount.

In a further alternative embodiment shown in FIG. 8, a slide mount 104 in a closed configuration may be used; that is, the slide mount 104 may have an upper portion 106 and a lower portion 108 coupled and/or fused together prior to insertion of the film segment 44. A cavity 110 is formed therebetween for inserting of the film segment 44, in which the film segment 44 is guided into the cavity 110 of the slide mount 104 with relatively high positional tolerances. That is, the mounting system 10 may have the second driver assembly 56 and/or other structures for finely inserting the film segment 44 into the cavity 110 of the already "closed" or formed slide mount 104. Accordingly, by using such slide mounts 104, the mounting system 10 may not require the use of the overhanging edge 74 and/or the function of the third driver assembly 72 to close the slide mount 104 with the film segment 44 positioned therein. The third driver assembly 72 may thus be dedicated to moving the slide mount 104 as a mounted slide into the second housing 78.

As shown in FIG. 8, the slide mount 104 may be constructed in a manner as described in commonly assigned U.S. patent application Ser. No. 08/896,841 entitled: FILM SLIDE AND FILM EXTRACTOR, and filed in the names of Daniel Pagano, Dale McIntyre, David Patton, and Edward Weissberger; which is incorporated herein by reference. Accordingly, the slide mount 104 may have a region 112 of magnetic material to be written upon by the magnetic writer 76, and a cut-out portion 114 for positioning and orienting the slide mount 104 into a predetermined proper orientation.

For example, the first housing 64 may include an orienting protrusion (not shown in FIG. 1) which engages the cut-out portion 114 for correctly orienting the slide mounts 38 stacked in the mounting system 10. After insertion of the film segment 44, the cut-out portion 114 may then be engaged by the pusher 68 for moving the slide mount 104 in the longitudinal direction of the arrow 42.

In addition, the slide mount 104 may include a locking aperture 116 and an extraction slot 118 for subsequently extracting the film segment 44 from the slide mount 104 by engaging and moving at least one perforation 26, as described in the incorporated patent application. Further, using such slide mounts 104 in the disclosed mounting system 10, the mounting system 10 may be incorporated into a film segment printing system and method described in commonly assigned U.S. patent application Ser. No. 08/897,171 entitled: FILM SEGMENT PRINTING SYSTEM AND METHOD, and filed in the names of David Patton, Daniel Pagano, Dale McIntyre, and Edward Weissberger; which is incorporated herein by reference. In addition, the logic and control computer 16 of the disclosed mounting system 10 may be incorporated in or operate in conjunction with the logic and control computer 16 of the above-incorporated patent application.

In use, the mounting system 10 operates according to a method having the steps of: successively generating film segments, detecting the orientation of the film slides, orienting the film segments into a proper orientation, mounting the film segments into a slide mount, and magnetically writing the orientation of the film segment into the slide mount on a region of magnetic material disposed upon each slide mount.

While the disclosed film slide orienting mounting system is particularly shown and described herein with reference to the preferred embodiments, it is to be understood that various modifications in form and detail may be made without departing from the scope and spirit of the present invention.

The invention has been described in detail with particular reference to certain preferred embodiments thereof, but it will be understood that variations and modifications can be effected within the spirit and scope of the invention.

PARTS LIST

10 mounting system
12 frame
14 magazine or spool
16 logic and control computer
18 output bus
20 path
22 film
24 magnetic region
26 perforation
28 fat bit region
30 magnetic reader
32 input bus
34 detector
36 knife assembly
38 slide mounts
40 mounted slides
42 arrow
44 film segment
46 first driver assembly
48 table
50 support
52 motor
54 central axis
56 second driver assembly
58 slide mount
60 top portion of slide mount
62 bottom portion of slide mount
64 first housing
66 opening of first housing
68 pusher
70 closed slide
72 third driver assembly
74 overhanging edge
76 magnetic writer
78 second housing
80 opening of second housing
82 entering slide
84 assembly frame
86 assembly frame
88 rotatable table
90 first surface
92 second surface
94 fourth driver assembly
96 rotatable frame
98 table
100 first portion
102 second portion
104 slide mount
106 upper portion
108 lower portion
110 cavity
112 magnetic region
114 cut-out portion
116 locking aperture
118 extraction slot

What is claimed is:

1. A film slide mounting system comprising:

a detector for detecting an orientation of a film segment;

a processor, responsive to the detected orientation of the film segment, for generating a corresponding rotation control signal;

a rotatable table, responsive to the rotation control signal when the film segment is positioned thereupon, for rotating about an axis to orient the film segment into a predetermined orientation to be mounted into a slide mount; and a magnetic writing device for writing the orientation of the film segment magnetically onto the slide mount in a region of magnetic material disposed upon the slide mount.

2. The film slide mounting system of claim 1 wherein the magnetic writing device is responsive to orientation data for writing the orientation onto the slide mount; and wherein the processor generates the orientation data from the detected orientation of the film segment.

3. The film slide mounting system of claim 1 further comprising:

a knife for cutting a portion of film to generate the film segment.

4. A film slide mounting system comprising:

a detector detecting an orientation of a film segment;

a processor, responsive to the detected orientation of the film segment, generating a corresponding rotation control signal;

a rotatable table, responsive to the rotation control signal when the film segment is positioned thereupon, said table having a central axis, said table rotating said film segment in a plane about said central axis to orient the film segment into a predetermined orientation to be mounted into a slide mount; and a driver assembly moving the film segment to the slide mount for insertion therein, wherein the driver assembly holds the film segment on the rotatable table and rotates about the central axis as the rotatable table rotates.

5. The film slide mounting system of claim 4 further comprising:

an optical code detector for detecting an optical code on the film segment; and wherein the processor responds to the detected optical code to generate the rotation control signal.

6. The film slide mounting system of claim 1 further comprising:

a driver assembly for moving the film segment to the slide mount for insertion therein.

7. The film slide mounting system of claim 4 wherein the slide mount includes a physical orientation notch for correctly orienting the slide mount in a predetermined correct orientation in a housing, and the driver assembly moves the film segment to the slide mount for insertion therein in a corresponding predetermined correct orientation.

8. A film slide mounting system comprising:

a detector for detecting an orientation of a film segment;

a processor, responsive to the detected orientation of the film segment, for generating a corresponding rotation control signal;

a rotatable table, responsive to the rotation control signal when the film segment is positioned thereupon, for rotating about an axis to orient the film segment into a predetermined orientation to be mounted into a slide mount; and a driver assembly for moving the film segment to the slide mount for insertion therein;

wherein the processor generates a distance control signal when the film segment is positioned upon the rotatable table;

wherein the rotatable table and the driver assembly are in a first vertical position having a first distance therebetween, and at least one of the driver assembly and the rotatable table with the film segment positioned thereupon responds to the distance control signal for moving to a second vertical position having a second distance therebetween, in which the second distance is greater than the first distance; and wherein, after at least one of the driver assembly and the rotatable table moves to the second vertical position, the rotatable table responds to the rotation control signal to rotate.

9. The film slide mounting system of claim 8 wherein, after the rotatable table rotates, at least one of the driver assembly and the rotatable table with the re-oriented film segment thereupon moves to the first vertical position with the first distance therebetween.

10. An automated film slide mounting system comprising:

a detector for detecting an orientation of film;

a knife assembly for successively cutting the film to generate film segments therefrom;

a processor, responsive to the detected orientation of the film, for generating a corresponding rotation control signal and corresponding orientation data;

a rotatable table, responsive to the rotation control signal, for rotating about an axis to orient each of the film segments into a predetermined orientation;

a set of driver assemblies for holding each film segment on the rotatable table during rotation of the rotatable table, and for progressively moving each film segment for insertion into a slide mount; and magnetic writing device, responsive to the orientation data, for writing the orientation of the film segment magnetically into the slide mount on a region of magnetic material disposed upon each slide mount.

11. The automated film slide mounting system of claim 10 further comprising:

an optical code detector for detecting an optical code on each film segment; and wherein the processor responds to the detected optical code to generate the rotation control signal.

12. The automated film slide mounting system of claim 10 wherein each driver assembly, when holding a film segment on the rotatable table, rotates about the axis as the rotatable table rotates.

13. The automated film slide mounting system of claim 10 wherein the processor generates a distance control signal when the film segment is positioned upon the rotatable table; and wherein the rotatable table and the set of driver assemblies are in a first vertical position having a first distance therebetween, and at least one of the set of driver assemblies and the rotatable table with the film segment positioned thereupon responds to the distance control signal for moving to a second vertical position having a second distance therebetween, in which the second distance is greater than the first distance; and wherein, after at least one of the set of driver assemblies and the rotatable table moves to the second vertical position, the rotatable table responds to the rotation control signal to rotate.

14. The automated film slide mounting system of claim 13 wherein, after the rotatable table rotates, at least one of the set of driver assemblies and the rotatable table with the re-oriented film segment thereupon moves to the first vertical position with the first distance therebetween.

15. A method for generating a film slide comprising the steps of:

(a) detecting the orientation of a film segment;

(b) orienting the film segment into a predetermined orientation;

(c) mounting the oriented film segment into a slide mount; and (d) magnetically writing the orientation of the film segment onto the slide mount in a region of magnetic material disposed upon the slide mount.

16. The method of claim 15 further comprising, before said detecting step, the step of:

cutting a portion of film with a knife to generate the film segment.

17. A method for generating a film slide comprising the steps of:

detecting an orientation of a film segment;

generating a rotation control signal from the detected orientation;

orienting the film segment into a predetermined orientation, said step of orienting including rotating a table having the film segment positioned thereon about an axis in response to the rotation control signal; and mounting the oriented film segment into a slide mount.

18. The method of claim 17 wherein said detecting and generating steps are further characterized as:

detecting an optical code on the film segment; and generating the rotation control signal from the detected optical code.

19. The method of claim 17 further comprising, concurrent with the detecting, orienting, and mounting steps, the step of:

moving the film segment in a direction to the slide mount for insertion therein.

* * * * *